(12) United States Patent
Battlogg et al.

(10) Patent No.: US 8,800,730 B2
(45) Date of Patent: Aug. 12, 2014

(54) SHOCK ABSORBER FOR A BICYCLE

(75) Inventors: Stefan Battlogg, St. Anton I.M. (AT);
Martin Walthert, Aarberg (CH);
Gernot Elsensohn, St. Anton I.M. (AT);
Jürgen Pösel, Bludenz (AT)

(73) Assignee: DT Swiss Inc., Grand Junction, CO (US)

( * ) Notice: Subject to any disclaimer, the term of this patent is extended or adjusted under 35 U.S.C. 154(b) by 254 days.

(21) Appl. No.: 13/358,134

(22) Filed: Jan. 25, 2012

(65) Prior Publication Data

US 2012/0186921 A1    Jul. 26, 2012

(30) Foreign Application Priority Data

Jan. 25, 2011    (DE) .......................... 10 2011 009 406

(51) Int. Cl.
*F16F 9/53*    (2006.01)

(52) U.S. Cl.
USPC ........................................................ 188/267.1

(58) Field of Classification Search
USPC .................................. 188/267, 267.1, 267.2
See application file for complete search history.

(56) References Cited

U.S. PATENT DOCUMENTS

| | | | |
|---|---|---|---|
| 4,790,522 A | | 12/1988 | Drutchas |
| 6,019,201 A | * | 2/2000 | Gordaninejad et al. ... 188/267.1 |
| 6,131,709 A | | 10/2000 | Jolly et al. |
| 6,151,930 A | | 11/2000 | Carlson |
| 6,471,018 B1 | | 10/2002 | Gordaninejad et al. |
| 6,851,529 B2 | | 2/2005 | Jones et al. |
| 7,364,022 B2 | * | 4/2008 | Gordaninejad et al. ... 188/267.2 |
| 7,806,390 B2 | | 10/2010 | Achenbach |
| 2007/0120300 A1 | | 5/2007 | Achenbach |
| 2010/0019514 A1 | | 1/2010 | Steinwender |
| 2010/0320656 A1 | | 12/2010 | Achenbach |
| 2011/0127706 A1 | | 6/2011 | Sims et al. |

FOREIGN PATENT DOCUMENTS

| | | |
|---|---|---|
| DE | 3905639 A1 | 9/1989 |
| DE | 3933624 A1 | 4/1991 |
| DE | 10240568 A1 | 3/2004 |
| DE | 69821799 T2 | 1/2005 |
| DE | 69829686 T2 | 9/2005 |
| DE | 60023017 T2 | 6/2006 |
| DE | 60308005 T2 | 2/2007 |
| DE | 102005062433 A1 | 6/2007 |
| DE | 102006037992 A1 | 2/2008 |
| DE | 102007003968 A1 | 7/2008 |

(Continued)

*Primary Examiner* — Melanie Torres Williams
(74) *Attorney, Agent, or Firm* — Laurence A. Greenberg; Werner H. Stemer; Ralph E. Locher

(57) ABSTRACT

A shock absorber for a bicycle or another, at least partly muscle-powered, vehicle has a damper device with a damper housing in which a first and a second damper chamber are separated from one another via at least one damper piston. A piston rod connected with the damper piston extends from the damper piston through the second damper chamber out of the damper housing. The first damper chamber is in communication with the second damper chamber via a flow duct that leads through the piston rod out of the damper housing toward at least one throttling device. The flow duct, at the throttling device, has a damping duct provided with a field-sensitive rheological fluid which, by way of a field generating device disposed at the throttling device, can be exposed to a field of a predetermined strength to influence the pass-through flow of the field-sensitive rheological fluid through the throttling device.

30 Claims, 4 Drawing Sheets

(56) References Cited

FOREIGN PATENT DOCUMENTS

| | | | |
|---|---|---|---|
| DE | 102009058847 A1 | 6/2011 | |
| EP | 1219858 A1 | 7/2002 | |
| JP | 4258542 A | 9/1992 | |
| JP | 6017871 A | 1/1994 | |
| WO | 2010007433 A2 | 1/2010 | |

* cited by examiner

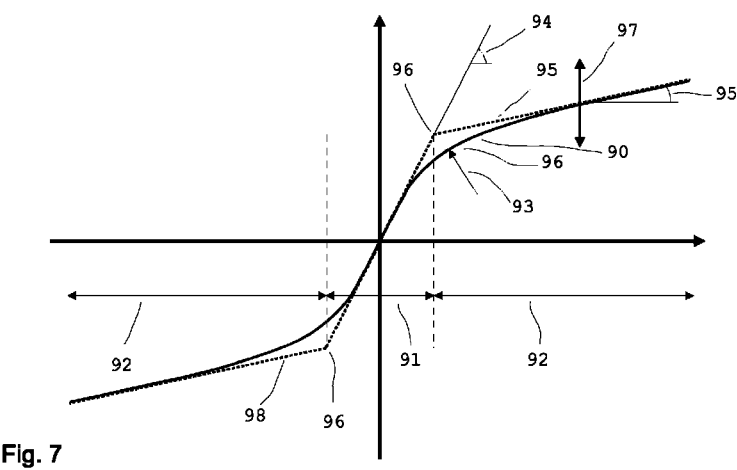
Fig. 7
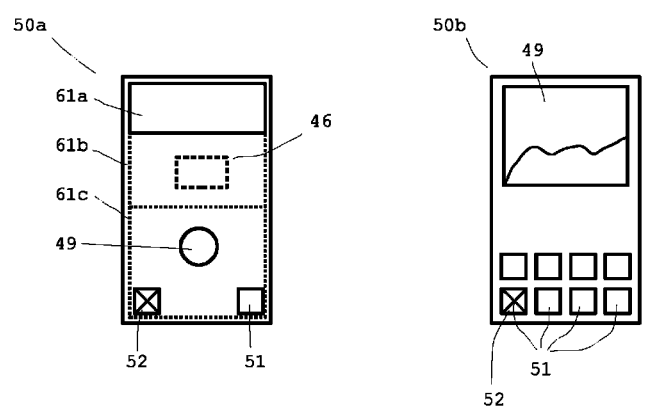
Fig. 8
Fig. 9

SHOCK ABSORBER FOR A BICYCLE

CROSS-REFERENCE TO RELATED APPLICATION

This application claims the priority, under 35 U.S.C. §119, of German patent application DE 10 2011 009 406.7, filed Jan. 25, 2011; the prior application is herewith incorporated by reference in its entirety.

BACKGROUND OF THE INVENTION

Field of the Invention

The present invention relates to a shock absorber for a muscle-powered or partially muscle-powered vehicle, and in particular a bicycle. The bicycle may be equipped with an auxiliary drive and in particular an electric auxiliary drive.

Many different types of rear wheel dampers and suspension forks for bicycles have become known in the prior art. A shock absorber typically comprises a spring unit for cushioning any shocks occurring and a damping unit for damping the spring vibration. In the case of rear wheel shock absorbers the spring unit and the damping unit are as a rule configured as an integral unit. In the case of suspension forks the damping unit and the spring unit may be disposed separately.

Most dampers for bicycles are operated with oil as the damping fluid. For damping, the damping fluid is conveyed from a first damping chamber to a second damping chamber through a valve gate throttling the flow. The size of the valve gate aperture determines the damping strength. An optimal damping is dependent on a number of various factors such as for example the rider's weight and in particular the terrain characteristics. It is desirable to set the damping strength in relation to loads such that weak shocks are damped less than heavy shocks. For rides on a road, a forest path, or directly off-road, different damping settings are therefore optimal.

For adjusting and influencing damping, magneto-rheological and electro-rheological fluids have become known whose characteristics can be influenced by means of applying a corresponding magnetic or electric field. The exemplary embodiments described in the present application of a damper using a magneto-rheological fluid (MRF) may thus also be constructed using an electro-rheological fluid.

Most magneto-rheological fluids consist of a suspension of small particles that polarize magnetically and which are finely dispersed in a carrier liquid such as an oil. The polarizing particles which tend to consist of a carbonyl ferrous powder typically have diameters between approximately 0.1 and 50 micrometers, forming chain-like structures under the influence of a magnetic field so as to cause considerable increase of the viscosity of the magneto-rheological fluid under the influence of the magnetic field in particular perpendicular to the field lines of the magnetic field.

As the magnetic field is switched off, the viscosity will drop virtually instantaneously. Examinations have shown that the typical response time lies in the range of a few milliseconds or even less. Thus, magneto-rheological fluids are suitable to be used in dampers of bicycles.

A general problem in constructing dampers lies in the plurality of different requirements for these shock absorbers. Shock absorbers for bicycles should offer flexibility of control. They should furthermore be compact and simple in structure and in particular also lightweight.

The construction of shock absorbers on rear wheels is in particular very exacting due to the installation conditions which tend to be standardized and comparatively constricted. Thus, rear wheel shock absorbers must have a defined stroke length given small external dimensions. The construction is narrowly restricted both regarding its length and regarding its diameter to allow installation in bicycles.

A particularly significant criterion is the weight of such a shock absorber since in the field of sports and competition, and in the professional field a comparatively slight weight reduction may result in significant advantages.

U.S. Pat. No. 6,471,018 B1 describes a magneto-rheological shock absorber in which a first damper chamber and a second damper chamber are separated by a damper piston. The damper piston is provided with a flow passage between the first and the second damper chamber on which an electromagnet can apply a magnetic field for setting the desired damping. It is one advantage of such a damper that via the strength of the magnetic field flexible control of the chain formation of the magneto-rheological particles is possible at all times. It is, however, a disadvantage that the weight of the electromagnet which extends over the entire length of the damping cylinder is comparatively high due to the considerable length and the required number of turns, thus resulting in a heavy shock absorber.

U.S. Pat. No. 6,151,930 describes a shock absorber, which is again damped by means of a magneto-rheological fluid. The electric coil for generating the magnetic field is disposed in the piston of the damper unit. The gap between the external piston wall and the damper housing allows the magneto-rheological fluid to pass from the one into the other damper chamber. Appropriate application of a magnetic field to the gap allows influencing the flow of the magneto-rheological fluid through the gap. The magnetic field generated by the coil passes through the gap and is closed by the damper housing. This is why the damper housing must be made of a magnetically conductive material which considerably increases the damper weight since the damper housing must consist of an appropriate material over its entire length. Manufacturing from a light metal alloy such as aluminum or the like is not possible.

U.S. Pat. No. 6,131,709 describes a rear wheel shock absorber for bicycles which is damped by means of a magneto-rheological fluid. One end of a damper chamber is provided, via a bore, with an outwardly connection to an external damping valve which is connected with an external unit disposed in parallel in which the second damper chamber is accommodated. The damping valve is provided with a permanent magnet whose position relative to the flow gap can be changed for adjusting the magnetic field strength in the flow gap. The disadvantage of such a system is the complex structure requiring a damper chamber disposed separately and in parallel which increases the construction and mounting steps and the weight of the rear wheel shock absorber.

Further, German published patent application DE 102 40 568 A1 describes a shock absorber for bicycles in which damper chambers filled with a magneto-rheological fluid are connected via a magneto-rheological valve. The lines required may run toward an external valve or else an internal valve is provided parallel to the damping cylinder, requiring a cavity parallel to the damper chambers. At their ends the two damper chambers are in connection with the internal valve via connection lines with the cavity. This shock absorber having an external valve is complicated in structure and the use of an internal valve results in a high weight due to the parallel cavity.

SUMMARY OF THE INVENTION

It is accordingly an object of the invention to provide a shock absorber which overcomes the above-mentioned disadvantages of the heretofore-known devices and methods of this general type and which provides for a shock absorber for an at least partially muscle-powered vehicle, and in particular a bicycle, which offers flexibility in control, is compact in structure, and allows a low weight without restricting functionality such as the stroke or the adjustable power range.

With the foregoing and other objects in view there is provided, in accordance with the invention, a shock absorber for a muscle-powered or partially muscle-powered vehicle, the shock absorber comprising:

a damper device having a damper housing with a first damper chamber and a second damper chamber formed therein;

at least one damper piston separating said first and second damper chamber from one another, and a piston rod connected to said damper piston and extending from said damper piston and through said second damper chamber out of said damper housing;

at least one throttling device;

said piston rod having a flow duct formed therein and fluidically connecting said first and second damper chambers to one another, extending through said piston rod and to said at least one throttling device;

said flow duct including at least one damping duct at said throttling device provided, said flow duct containing a field-sensitive rheological fluid; and a field generating device disposed at said throttling device for subjecting said field-sensitive rheological fluid to a field of a predetermined strength for influencing a flow of said field-sensitive rheological fluid through said throttling device.

In other words, the objects of the invention are achieved with a shock absorber for an at least partially muscle-powered vehicle and in particular a bicycle comprises at least one damper device having a damper housing. The damper housing is provided with a first and a second damper chamber separated from one another by at least one damper piston. A piston rod connected with the damper piston extends from the damper piston at least through the second damper chamber out of the damper housing. The first damper chamber is in connection with the second damper chamber via at least one flow duct leading in at least one position of the damper piston through the piston rod out of the damper housing to at least one throttling device. At the throttling device the flow duct comprises at least one damping duct provided with a field-sensitive, rheological fluid and which can be exposed to a field of a specific strength by means of at least one field generating device disposed at the throttling device for influencing the flow of the field-sensitive, rheological fluid through the throttling device.

The shock absorber according to the invention has many advantages. A considerable advantage of the shock absorber according to the invention is the possibility of a simple, compact structure. Disposing the throttling device as a flow valve external of the damping chambers and external of the damper housing allows to achieve a compact, lightweight structure of the entire shock absorber since the flow connection is established by the piston rod. Also, good heat dissipation is possible.

Using a field-sensitive rheological fluid allows flexibility of controlling the shock absorber according to the invention which can always be adjusted to the current conditions. The high response speed of these field-sensitive rheological fluids allows to realize real-time control of the damping characteristics of such a shock absorber.

Since the flow connection of the two damper chambers is realized through the piston rod a conventional construction can be chosen. This is a great advantage for compatibility with bicycles in the market thus allowing a wider range of use and also retrofitting. The damper piston may optionally be configured as a thin-walled piston in the axial direction so as to further save weight.

An advantage of disposing a flow valve external of the damper chambers is that the available space is larger. When a flow valve or an e.g. magneto-rheological flow throttle is placed inside the damper piston, then only comparatively small flow cross-sections can be realized in the damping duct. This results in high flow speeds. Even with the highest flow rates occurring in the damping duct the residence time of e.g. magneto-rheological particles must be higher by a certain rate than the response time since otherwise the efficiency and controllability of the throttling device drops significantly. For example even though magneto-rheological fluids response to an applied field within milliseconds, the high flow rates require a corresponding length of the damping duct for the desired damping effect to be definitely achieved. This is why damper pistons must be relatively long if a piston is to effect damping in a damping duct to always ensure the desired damping effect. The present invention places the damping duct or the damping valve external of the damper chambers so as to enable larger cross-sectional areas and thus lower flow rates. The diameter and the length of the damper piston are not significant.

In particular if a specific stroke length of the damper is required within a defined mounting space the damping duct in the piston cannot take any desired length.

Another significant advantage of the present invention is that the configuration options for designing the throttling device are broader external of the damper piston or the damper chambers. The throttling device can be optimized for application in terms of flow technology and electromagnetic properties. This does not necessarily involve a larger mounting space or higher weight; what is decisive tends to be the shape of the mounting space. For example if in a specific application an elongated, narrow damping duct is advantageous, it can be implemented relatively easily external of the damper housing in an appropriately shaped throttling device.

In all of the configurations at least part of the throttling device may be inside the piston rod at least partially. In this way, depending on the position of the damper piston in the damper at least part of the throttling device may be located within the damper housing. What is essential is that at least in one specific damper position the throttling device be located external of the damper housing.

Another considerable advantage of the invention is the considerably simplified heat dissipation. The waste heat generated when throttling the damping medium is not generated inside the damping chambers or in the damper piston but external of the damper chambers to thus allow a structurally simple and effective waste heat dissipation to the ambience. Overheating can be avoided even in the case of high loads and high summer temperatures. Employing complicated cooling systems or heat pipes for heat dissipation can be avoided.

Another advantage is that with the structure of the invention the structure of the damping chamber and the damper piston can be adapted to the application. The damper piston can be designed such that a specific force generates a specific pressure. It is no longer required to have a minimum diameter or a minimum length for accommodating the throttling device.

This also allows to counteract the self-strengthening process where when positioning the throttling device in the damper piston the piston diameter first increases for receiving the throttling device. Given constant characteristic damper curves the flow ducts and thus also the throttling device must consequently expand which in turn would result in a larger damper piston. the drawback of such a structure is that many other dimensions are dependent on the piston diameter and a somewhat larger damper piston may cause a marked increase of mounting space and weight. These drawbacks are avoided with the invention.

In particularly preferred specific embodiments the shock absorber comprises at least one spring device comprising in particular a first and at least one second spring chamber provided with a compressible medium. In preferred embodiments the spring device is configured as a gas spring wherein then the first and the second spring chamber are preferably substantially provided with air as the compressible medium. Or else it is likewise conceivable to employ other compressible media which show reversible or at least substantially reversible response to pressure loads.

Particularly preferably the damper housing dips into the spring device in compressing. Preferably at least the first spring chamber radially surrounds the second damper chamber at least in part. In compressing for example the first spring chamber may also radially surround the first damper chamber at least in part. In rebounding the damper housing correspondingly re-exits from the spring device at least in part.

In all of the configurations it is preferred for the shock absorber provided with a first end and a second end to preferably comprise a first force transfer section or connection at its first end and at its second end, a second force transfer section or connection. Preferably the damper device is positioned closer to the first end and the spring device, closer to the second end of the shock absorber.

In all of the configurations the second spring chamber is preferably located following the second damper chamber. In particular does the second spring chamber directly abut the second damper chamber. The first and the second spring chambers are preferably separated by a spring piston connected with the damper housing.

Preferably the throttling device comprises a damping duct extending over part of or the entire periphery of the throttling device. It is also preferred to provide a plurality of damping ducts disposed distributed about the periphery. Particular or all of the damping ducts are in particular each configured as a narrow damping gap. The height of the damping duct in the direction of the field lines is preferably considerably less than the width of the damping duct transverse to the flow direction and transverse to the field.

In all of the configurations it is particularly preferred for a length of the damping ducts transverse to the flow direction to be larger than a periphery of the damper piston. Such a configuration is partially advantageous because in this way the flow rate in the damping ducts is reduced with the gap width the same. In this way an extension of the damping ducts in the flow direction can be reduced. The reduced flow rates cause a longer residence time of the particles of the field-sensitive fluid in the damping ducts. In this way the extension of the throttling device can be reduced.

When the damping ducts are aligned in the axial direction of the shock absorber and follow behind the second spring chamber in the axial direction, the entire mounting length of the shock absorber can be reduced or the stroke length can be extended given an unchanged mounting length. If the damping duct were provided in the damper piston, then the extension of the damper piston must be designed correspondingly larger in the axial direction to ensure the required residence time with the then occurring higher flow rates. The flow connection according to the invention through the piston rod to a throttling device disposed external of the damper chambers allows a shorter axial length of the shock absorber and may contribute to weight reduction.

Preferably the throttling device follows the second spring chamber in the axial direction. The second spring chamber preferably has the same internal diameter as does the first spring chamber since both of these are disposed in a spring housing in which the spring piston is displaceably disposed on the inside of the spring housing. This means that the radial diameter of the second spring chamber is larger than the radial diameter of the damper chambers. This allows an enlarged cross-sectional area for the damping duct in the flow direction such that the achievable flow rate can be lower than with the damping duct disposed in the damper piston.

Moreover it is optionally possible to further enlarge the external diameter of the throttling device relative to the external diameter of the spring device so as to provide a still larger area for a damping duct in the axial direction. On the whole a reduced flow rate is made possible to thus allow to realize a reduced axial length.

The height of the damping duct or of the damping gap in the direction of the field lines is kept low when employing magnetic fields to maintain a relatively low magnetic resistance. Preferably the damping gap can be segmented in the direction of the field by a partition wall made of a field-conductive material. Generating the magnetic field required for damping is thus still simpler and the energy requirement of the coil can be very low.

It is advantageous for the mounting space and the weight for the cross-sectional area through which the magnetic field flows to be small since then the entire magnetic circle is small and lightweight. This can be achieved by way of employing, instead of one single duct, a plurality of smaller ducts located in the same magnetic circle. Particularly advantageously these ducts are stacked immediately on top of one another. This fan-like structure reinforces the effect with at least one partition wall provided transverse to the field and parallel to the flow, which is particularly preferably manufactured from a ferromagnetic material. In this way two or more sub-ducts are disposed in the field direction.

In all of the configurations it is conceivable for at least one flow duct at the throttling device to be divided via at least one separator into at least two or more damping ducts disposed in particular transverse to the field. A separator can prevent flow in duct areas in which the field is pronounced less or not at all. Also, a separator may separate from one another duct areas having different functions for example to enable the blocking of particular duct areas in one flow direction. It is possible for a separator to be configured as a separate part and to consist for example of a plastic or light metal or the like.

In particular when employing magneto-rheological fluids it is preferred for the separator to consist of a non-magnetic material or a magnetic isolator. For example it is possible for the damping duct or the damping ducts to extend over the entire periphery of the throttling device. Then the peripheral duct can be divided via the separators into separate damping ducts each extending for example over an angle sector. An advantage of such an arrangement is that the separators do not only share the flow ducts with one another but also lead to a centered, defined arrangement within the throttling device.

In preferred configurations at least one damping duct can be exposed at least in part to a field of a field generating device extending in the radial direction. In particular does a section or the entire damping duct extend in the axial direction at least in part.

Or else it is possible and preferred that at least one damping duct or a section of a damping duct can be exposed to a field of the field generating device extending in the axial direction.

It is for example possible for the field-sensitive fluid passing out at the end of the piston rod to be redirected in the radial direction and during this radial flow to be exposed to a field of the field generating device extending in the axial direction. This may result in a star- or disk-shaped gap in which the field-sensitive fluid is guided from radially inwardly to radially outwardly or vice versa.

Or else it is possible for at least one section of the damping duct to extend in the radial direction and for at least one section of the damping duct to extend in the axial direction where each is exposed to a field extending transverse thereto.

External of the damper chambers the damping duct can virtually be shaped or arranged as desired. The damping duct may bend around the piston rod for example in a spiral, in concentric or eccentric circles or elliptically.

In particularly preferred configurations the piston rod has at least two flow ducts. This is possible e.g. through a double-walled design of the piston rod. Then e.g. the internal flow duct may lead from the first damping chamber to the throttling device and the external flow duct, from the throttling device to the second damping chamber.

Or else it is also possible for the piston rod to extend outwardly through both of the damper chambers so as to allow an external return flow.

In preferred configurations it is possible for at least one flow valve to be provided in the damper piston. Such a flow valve is in particular a mechanical flow valve configured for example as a one-way valve. This allows control for example of compressing via the throttling device while rebounding and the corresponding flow from the second damper chamber to the first damper chamber is controlled by at least one flow valve provided in the damper piston. Such a flow valve may e.g. be configured as a spring-biased, mechanical flow valve which automatically closes in one flow direction and in the other flow direction opens upwards of a specific pressure difference. The level of the pressure difference may optionally be adjustable.

The throttling device may consist of multiple, independent damping ducts each having a random number of field generating units. At least one additional valve may, dependent on the flow direction, the pressure, the operational state or other parameters, control the flow through the different damping ducts.

A simple configuration provides for example two independent damping ducts which are blocked or activated by a simple, mechanical valve, depending on the flow direction. This allows ease of implementing different properties depending on the direction of movement, for example as the compression and rebound stages. This adaptation allows large energy savings since each of the deviations from the zero-current basic curve can be reduced. This allows to realize different characteristics of the damper device for the compression and the rebound stages.

It is for example possible to form groups of damping ducts wherein e.g. all of the damping ducts act in the compression stage (or rebound stage) while some are blocked by one-way valves in the rebound stage (or compression stage).

It is also possible to provide shim valves for the compression stage or rebound stage in series with the at least one damping duct which in the compression stage or rebound stage throttle the maximum flow cross-section.

In preferred more specific embodiments the field generating device comprises at least one and in particular at least two field generating units.

It is also possible to provide more than two field generating units. For example each damping duct may be provided with a separate field generating unit. Or else it is possible to provide each damping duct with two or more field generating units which can be activated in groups or separately each.

Particularly preferably at least one damping duct can be exposed to an inhomogeneous field. Particularly preferably the inhomogeneity of the field can be controlled.

Advantageously the flow cross-section of the damping duct or of all of the damping ducts can be influenced such that at least one transition section and at least one blocking section and/or at least one bypass section can be set. The damping duct cross-section is classified as virtual duct cross-sections having different properties depending on the locally prevailing field strength. In one blocking section the flow is virtually completely blocked while the bypass section serves as a bypass, allowing virtually unrestricted flow-through. In the transition section an inhomogeneous field may act, causing a correspondingly variable flow resistance. In particular does the transition section allow to achieve a smooth transition of the response reaction of the shock absorber. The inhomogeneity of the field is preferably such that the ratio from maximum to minimum field strength in the transition section is preferably >10 and in particular >100 or >1000. The ratio of the field strengths in the blocking section to the field strength in the bypass section correspondingly is again preferably >10 and in particular >100 and preferably >1000, 10000 or 100000, values of >1000000 are likewise conceivable.

In specific configurations the transition section is a section to which a relatively homogeneous or even most homogeneous field is applied, only the field strength is between the field strength in the blocking section and the field strength in a bypass section. Such a configuration preferably provides a plurality of damping ducts or regions of one joint damping duct on which one field each can be applied separately. A homogeneous field can be applied on each single damping duct. High or even maximum field strengths in different damping ducts allow to form at least one blocking section. One damping duct or multiple, adjacent damping ducts without a field form a bypass section. Furthermore, at least one damping duct having a medium field may be provided which serves as a transition section.

Such a system also allows that multiple damping ducts configured at increasing or decreasing, stepped field strengths, form a transition cluster or transition segment in which a highly inhomogeneous field acts on the whole.

Particularly preferably at least part of the transition section and/or the bypass section can be adjusted at the cross-sectional area of the entire flow duct or at least of one damping duct. Providing different damping ducts to each of which one or more field generating units apply an appropriate field allows a simple way of setting an area portion for example of the bypass section in which the appropriate field generating units are deactivated. Adjusting a portion of the transition section may be done by way of activating multiple adjacent field generating units such that they generate appropriately different field strengths.

In particular at least two damping ducts can be exposed to fields of different strengths of different field generating units.

In all of the configurations at least one field generating device comprises, or is configured as, a magnetic device. To this end the field generating device may comprise a magnetically conductive ring conductor which serves for closing the field lines after passing through the damping duct. It is possible for a magnetically conductive ring conductor to completely or at least substantially completely surround at least one damping duct in the radial direction. It is possible for at least one magnetic device to comprise at least one permanent magnet for generating a static magnetic field. Preferably at least one field generating unit comprises at least one coil. The coil together with a core generates a magnetic field which may strengthen or attenuate the magnetic field of the permanent magnet to adjust a correspondingly modulated magnetic field in the damping duct.

It is also possible that the field generating unit comprises a permanent magnet the magnetization of which can be permanently changed or adjusted by at least one magnetic pulse of the coil. A short magnetic pulse sets the magnetization of the permanent magnet for a considerably longer period. In this way current for the coil is required for a short time only while the magnetic field of the permanent magnet is subsequently permanently maintained. The length of the magnetic pulse may be e.g. in the range of milliseconds or e.g. 1 second while the magnetic field in the permanent magnet is subsequently maintained for several minutes, days, or even years.

In particular can the permanent magnetization of the permanent magnet be set by way of at least one magnetic pulse of the field generating unit to any desired value between zero and remanence of the permanent magnet. The magnetization polarity can in particular be changed. Intentional application of an attenuating, alternating magnetic field also allows to demagnetize the permanent magnet.

This configuration allows to adapt the magnetization of the permanent magnet to the current requirements in relation to the currently prevailing conditions. This may be done during operation to thus allow continuously or periodically changing or adapting the magnetization of the permanent magnet e.g. when turning from a dirt road onto a paved road or even while riding on a forest path. The permanent magnetization of one or more permanent magnets allows to save energy since current is required only for changing the magnetization but not for constantly maintaining the magnetic field.

It is also possible to change the magnetization of the permanent magnet in a number of predetermined steps and to employ the coil or another coil in addition to fine adjustment so as to obtain defined magnetic field adjustment. This mode of operation again requires less energy since energy is required for fine adjustment only.

In all of the configurations it is preferred for the damper housing and/or spring housing to consist of a non-magnetic material such as a light metal alloy or a fibrous composite material.

In all of the configurations it is preferred to provide at least one control device for controlling the field generating device. The control device in particular also serves for controlled emission of magnetic pulses of the field generating unit. At least one sensor may be provided for supplying the control device with data about the road surface, position, velocity, etc.

In all of the configurations the damper piston may be provided with one or more magnet(s) for realizing a permanent seal from the damper housing. Then a complicated sealing between the damper piston and damper housing can be dispensed with.

In all of the configurations a permanent magnet of the field generating device may consist at least in part of at least one hard-magnetic material showing a certain remanence and coercitive field strength. Materials having these properties can be magnetized permanently and again demagnetized permanently. The strength of magnetization is related to the strength of the magnetic pulse but not to the duration of the magnetic pulse.

The pulse length of the magnetic pulses is in particular shorter than 1 minute, preferably the pulse length is shorter than 10 seconds and particularly preferably shorter than 1 second. Magnetic pulses having a pulse length in the range of a few microseconds may suffice for permanently changing and setting the magnetization of the permanent magnet, with the magnetization setting of the permanent magnet then being permanently available until the next magnetic pulse changes the magnetization again. Usually the magnetic pulse generating device limits the minimum pulse length, times in the range of hundredths or tenths of seconds are possible as are a few milliseconds or less.

In all of the configurations and more specific embodiments the permanent magnet in particular consists of such a material at least in part, being structured such that a magnetic flux density of at least 0.3 Tesla and in particular of at least 0.5 Tesla can be generated in the damping duct. This does not mean that this flux density must remain set at all times but only that at the maximum field strength of the permanent magnet that can be generated it must be possible to generate the indicated magnetic remanence in the damping duct. In particular is the magnetic remanence at least 0.5 and in particular 0.8 Tesla. Advantageously the permanent magnet consists at least in part of a material showing a coercitive field strength of above 1 kA/m (=1,000 ampere/meter) and in particular above 5 kA/m and preferably above 10 kA/m. Coercitive field strengths of 30, 40 or 50 or even 100 or 150 kA/m are in particular possible.

Particularly preferably the or at least one permanent magnet consists at least in part of a material showing a coercitive field strength of less than 1,000 kA/m (=1,000,000 ampere/meter) and preferably less than 500 kA/m and particularly preferably less than 200 kA/m. Particularly preferably the coercitive field strength lies in a range between 10 kA/m and 200 kA/m.

Preferably the permanent magnet consists at least in part of a material such as alnico or a material showing similar magnetic properties, such as FeCrCo, FeCoVCr, or CuNiFe. Alnico or a similar material is particularly preferably employed. Alnico is an alloy of aluminum, nickel and cobalt and may include other elements such as iron or copper. Alnico allows to manufacture permanent magnets which usually may show a remanence of 0.7 to 1.2 T and a coercitive field strength of 30 to 150 kA/m or even higher.

An alnico magnet shows relatively high coercitive field strengths, correspondingly countering external magnetic fields with high resistance such that re-magnetization or de-magnetization in a closed magnetic circle cannot be obtained with normal fields occurring naturally. On the other hand the coercitive field strength is relatively low compared to e.g. neodymium such that an electric magnet or an electric coil allow de-magnetization involving relatively low energy levels.

Another advantage of alnico is the course of the de-magnetization curve (2nd quadrant in the BH diagram), the high thermal stability, and the good chemical properties relative to other usual magnetic materials.

When the damper is in lockout mode, then the piston movement must be prohibited at any force lower than a defined lockout force. To this end the flow of the magneto-rheological fluid is blocked through the most homogeneous magnetic field in the flow duct possible. In this case a configuration of the flow duct as a flat gap is most advantageous.

In normal damper operation it is preferred that the damping duct can be exposed to an inhomogeneous magnetic field. The inhomogeneity of the magnetic field across the damping duct preferably has a ratio from the largest to the smallest field strength of above 10 and in particular of above 100 or even above 1000. Due to the inhomogeneity the damping duct may be subdivided into various sections in the direction of the flowing medium by way of the field strength. Areas having no or only a very weak field are designated as bypass sections and areas having a strong field, as blocking sections. Transition sections may lie in-between are the in which the field strength increases from a low to a higher value.

Preferably the flow duct comprises at least one transition section and at least one blocking section and/or at least one bypass section. The field strength ratio in the blocking section to the bypass section is in particular above 10 and particularly preferably above 100. The field strength ratio of the transition section to the bypass section is in particular above 5 and preferably above 10. Transition between individual sections may be fluent. Or else, mechanical separation between individual sections e.g. by partitions or partition walls is possible.

By way of a bypass or passage section, zero passage of the force-speed curve is sought in which an idle damping piston already starts moving under small or minute forces, thus damping occurring shocks. Such a zero passage of the force-speed curve can be ensured by a bypass section.

With low speeds the magneto-rheological fluid flows through the bypass or passage section only. As speed increases, pressure loss in the bypass section increases until a critical value is reached at which the shear stresses of the magneto-rheological fluid in the blocking section of the flow duct are reached and exceeded. Starting at this differential pressure the magneto-rheological fluid flows not only in the bypass section but in the blocking section as well. Thus as the speed continues increasing the pressure rises more slowly than before. The system, however, entails a break point in the gradient characteristics when the magneto-rheological fluid also flows through the blocking section beyond a fixed differential pressure. With shock absorbers at bicycles a smooth transition from the "low speed" to the "high speed" range is sought to allow comfortable riding characteristics. To this end the break point in the pressure-speed curve requires adequate rounding. Only then will a damper be distinguished by high riding comfort and increased safety due to better road adhesion.

Presently this can be achieved by providing a transition section with an inhomogeneous magnetic field wherein as the differential pressure increases, an increasing portion of the transition section allows passage of the magneto-rheological fluid. As the speed increases, the bypass section extends due to the increasing differential pressure causing a decrease of the transition section, thus the pressure-speed curve flattens out increasingly. As was described above, the flow will also pass through the blocking section above a specific differential pressure with the transition being fluid.

Other features which are considered as characteristic for the invention are set forth in the appended claims.

Although the invention is illustrated and described herein as embodied in a shock absorber for a bicycle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 7 the characteristic curve of a valve having a transition section;

FIG. 8 another electronic unit for the shock absorber according to FIG. 3; and FIG. 9 yet another electronic unit for the shock absorber according to FIG. 3.

DETAILED DESCRIPTION OF THE INVENTION

With reference to the enclosed figures an exemplary embodiment of a bicycle 200 equipped with shock absorbers 100 will be discussed below.

Figure 1:
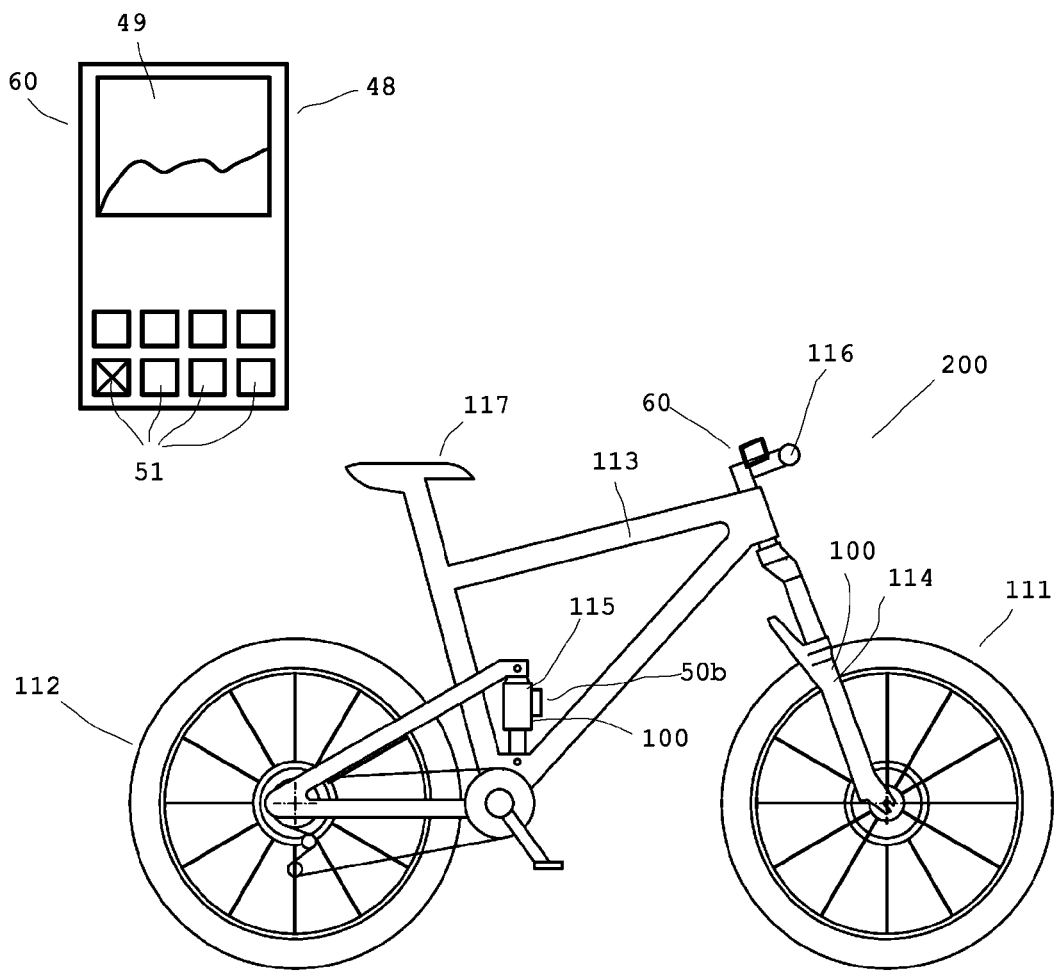
FIG. 1 a schematic view of a bicycle equipped with a shock absorber according to the invention.

Referring now to the figures of the drawing in detail and first, particularly, to FIG. 1 thereof, there is shown a schematic illustration of a bicycle 200 configured as a mountain bike and comprising a frame 113 and a front wheel 111 and a rear wheel 112. Both the front wheel 111 and the rear wheel 112 are equipped with spokes and may be provided with disk brakes. A gear shifting system serves to select the transmission ratio. Furthermore the bicycle 200 comprises a handlebar 116 and a seat or saddle 117.

The front wheel 111 is provided with a shock absorber 100 configured as a suspension fork 114 and the rear wheel is provided with a shock absorber 100 configured as a rear wheel damper 115. A central control device 60 is presently provided at the handlebar 116.

The central control device 60 may be employed as a suspension system, controlling both the suspension fork 114 and the rear wheel damper 115 in synchrony. Control of the shock absorbers 100 and further bicycle components may be provided in dependence on many different parameters and also by way of sensor data. Optionally the suspension and/or damping characteristics of the seat post can be set.

Additionally each of the shock absorbers 100 comprises at least one control device 46 at an electronic unit 50*c* provided to be exchangeable. Instead of the electronic unit 50*c* an electronic unit 50*a* or an electronic unit 50*b* might be provided (see FIGS. 8 and 9). The various electronic units 50*a* to 50*c* may comprise at least one battery unit 61*a* to 61*c*. The battery units 61*a* to 61*c* may be exchanged together with the respective electronic unit or separately. For example rechargeable battery units may be provided which can be readily removed from the shock absorber together with the electronic unit 50*a* to 50*c* for recharging the electronic unit. It is also possible and preferred to employ commercially available batteries. Preferably fuel cells or the like can be employed as well. In the case of bicycles having electro-assist, energy supply may occur by way of the central battery unit. Also possible is assist or operation by a dynamo or the like.

The electronic unit 50*c* is provided for advanced users, involving data exchanges with the central control device 60. In FIGS. 8 and 9 the electronic units 50*a* and 50*b* are illustrated schematically.

The present electronic unit 50*c* can at any time be replaced by another electronic unit 50*a* (see FIG. 8) operating autonomously with the incorporated control device 46. Then, no central control device 60 is provided or it serves purely as a bicycle computer.

It is also possible for the control device 46 or a control unit to be incorporated in the shock absorber wherein the control unit provides the basic functions. Operation then occurs via the electronic unit 50a, 50b or 50c via the central control device 60.

The control device 60 or the locally provided control devices 46 may largely provide control of the riding characteristics of the bicycle 200. While use is possible and preferred for purely muscle-powered bicycles, use with bi- and/or multi-cycles and in particular electro-assisted bicycles is also possible and preferred. By means of the control device 60 and/or the control devices 46 the damping characteristics of the suspension fork 114 and the rear wheel shock absorber 115 can be set in dependence on the currently set riding profile and on the other data provided to the control devices.

The central control device 60 is operated via an operating device 48. It is possible for the control device 60 to have a display device 49 and/or multiple operating knobs 51 and 52. It is also possible for the control device to be configured touch-sensitive or proximity-sensitive so as to allow operation by way of touching dedicated buttons or the like.

The control device 60 may then also serve as a bicycle computer, displaying data such as the current speed, and the average speed and/or kilometers per day, per tour, per lap and total. Also possible is displaying the current position, current altitude, or the route traveled or the route profile.

Figure 2:
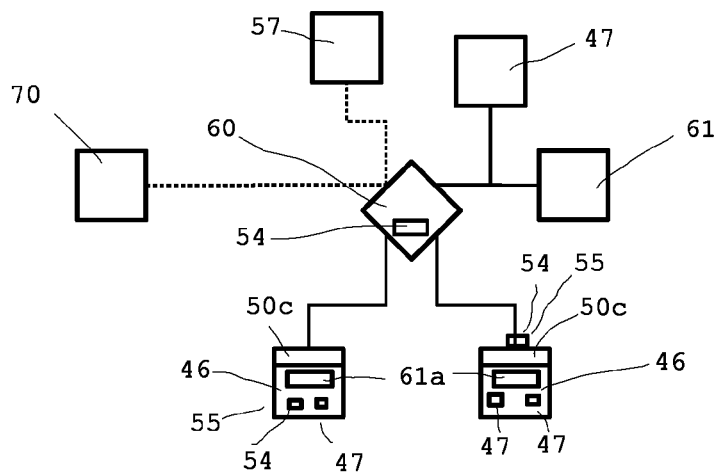
FIG. 2 a schematic view of the communication connections of the bicycle according to FIG. 1.

FIG. 2 shows a schematic illustration of the communication connections of the components involved. The central control device 60 may be connected with the individual components either wire-bound or wireless. The connection shown in a dotted line with the internet 70 is a wireless connection. The control device 60 may be connected with the battery unit 61a or have its own energy supply. Furthermore the control device 60 can be connected with a sensor 47 or multiple sensors 47. The graphical operating unit 57 or display unit may again have a wireless connection with the control unit 60. The shock absorber 100 of the suspension fork 114 or the shock absorber 100 of the rear wheel damper 115 may be connected wireless or wire-bound. Connection occurs through network interfaces 54 which may be configured as radio network interfaces 55 or as cable connection 56.

Figure 3:
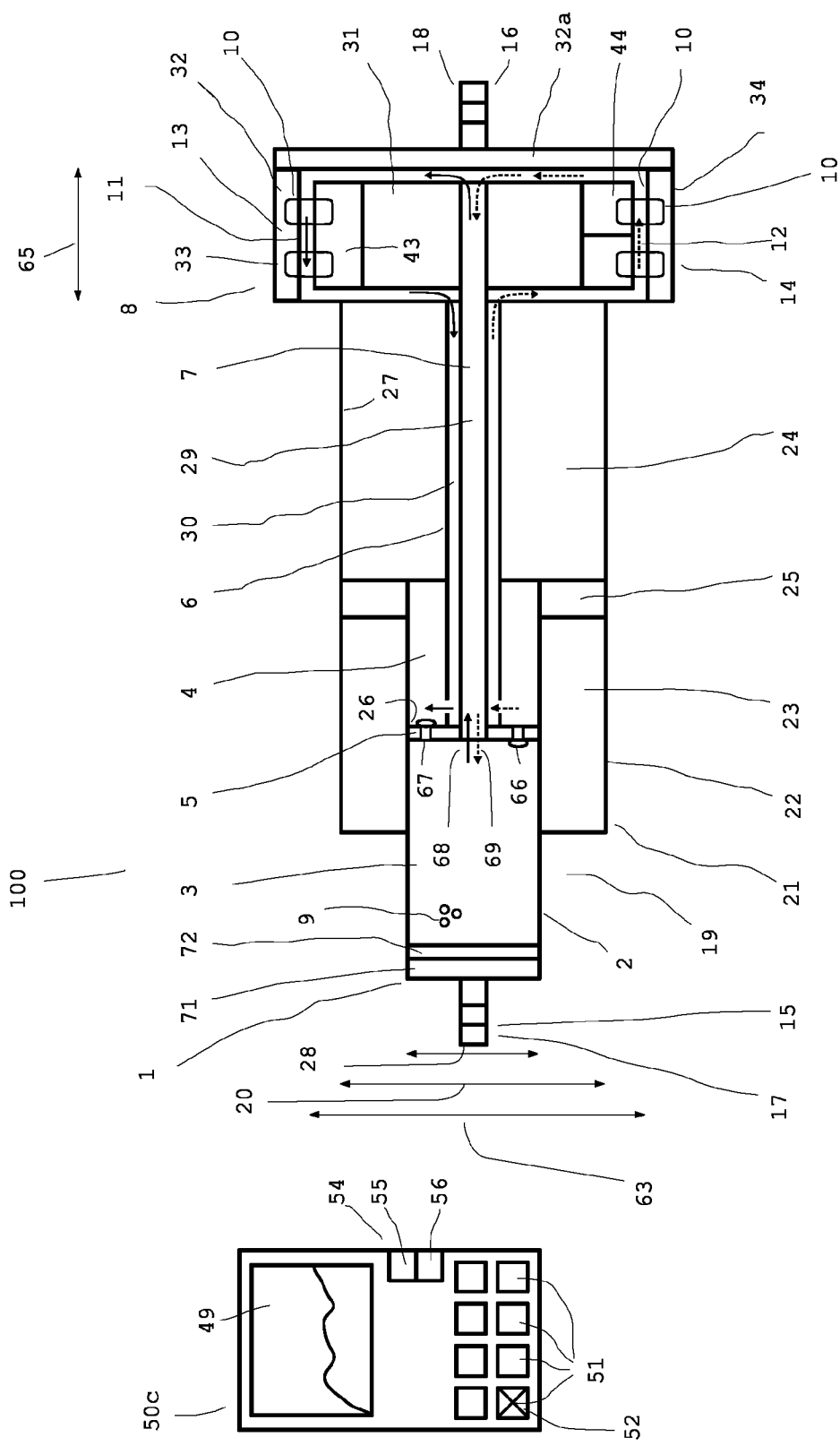
FIG. 3 a simplistic sectional view of a shock absorber of the bicycle according to FIG. 1 with an electronic unit.

FIG. 3 shows a simplistic view of a shock absorber 100 which is presently employed for example in the rear wheel damper 115.

The shock absorber 100 comprises a first end 15 and a second end 16. The shock absorber 100 is provided with a damper device 1 in a damper housing 2 and with a spring device 21 in a spring housing 22. The damper device 1 is located closer to the first end 15 and the spring device 21 is located closer to the second end 16. The first end is provided with a first force transfer section or connection 17 and the second end 16 is provided with a second force transfer section or connection 18.

Inside the damper housing 2 the first damper chamber 3 and the second damper chamber 4 are disposed which are separated from one another by a damper piston 5.

The first and the second spring chambers 23, 24 are separated by a spring piston 25 which is connected with the damper housing 2. The first spring chamber 23 is provided radially outwardly of the damper housing 2. The damper housing 2 dips into the spring device 21 with movement of the spring.

The outside 19 of the damper housing 2 serves as the sliding surface for the spring housing 22 and defines the first spring chamber 23 radially inwardly. Between the first spring chamber 23 and the damper housing 2 a seal is provided which is supported on the outside 19 of the damper housing 2. The spring piston 25 slides on the inside 27 of the spring housing 22.

As the shock absorber 100 compresses the volume of the second damper chamber 4 expands and also the volume of the first spring chamber 23 expands. In rebound, the volume of the first damper chamber 3 expands and also the volume of the second spring 24 chamber expands.

The damper piston 5 is retained by a piston rod 6 which extends from the damper piston 5 through the second damper chamber 4 out of the damper housing 2 and through the adjacent, second spring chamber 24 of the spring device 21. The damper piston 5 comprises a seal 26 towards the damper housing 2 causing a sealing by way of the magneto-rheological fluid via magnets incorporated in the piston.

The piston rod 6 in the present exemplary embodiment is configured double-walled, having a radially inwardly flow duct 29 and a radially outwardly flow duct 30 both of which form part of a flow duct 7. The flow duct 7 connects the first damper chamber 3 with the second damper chamber 4 wherein the fluid passing from the first damper chamber 3 into the second damper chamber 4 is firstly guided through the piston rod 6 out of the damper housing 2 to the exterior to the throttling device 8 from where it is guided through the external flow duct 29 of the piston rod 6 to the second damper chamber 4. For reducing the flow resistance the diameter of the piston rod can be expanded over conventional shock absorbers to provide an increased maximum flow cross-section. The fluid 9 is guided inside the piston rod 6 through the second spring chamber 24 to the throttling device 8 and back again. A throttle valve 45 is configured at the throttling device 8. The throttle valve 45 can be adjusted electrically and comprises at least two field generating devices 13 and 14 which are presently configured as magnetic field generating devices.

The arrows 68 shown in solid lines indicate the flow direction of the fluid 9 in the compression stage and the arrows 69 in dashed lines, the flow direction of the fluid 9 in the rebound stage.

Each of the field generating devices 13 or 14 may comprise one, two or more field generating units 33, 34 configured for example as coils 38, 39 having appropriate cores 40 and 41 so as to form a corresponding magnetic field 10 as electric current is applied. Each of the field generating units 33, 34 is configured as a magnetic device 31 for generating a magnetic field in the damping duct.

At least one damping duct 11, 12 is provided in the throttling device 8 for intentionally influencing the magneto-rheological fluid 9 passing through. The damping ducts 11, 12 may be aligned in parallel to the longitudinal axis of the shock absorber 100 and extend over a substantial part or even the entirety of a periphery of the throttling device 8.

Figure 4:
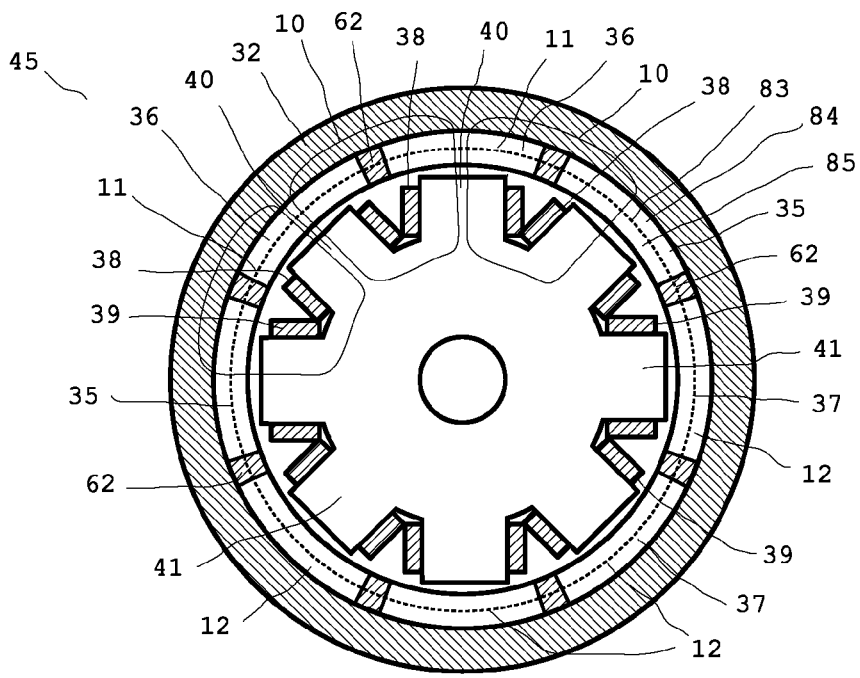
FIG. 4 a simplistic cross-sectional view of the throttling device of the shock absorber according to FIG. 3.

FIG. 4 shows a cross-section through the throttling device of the shock absorber 100 according to FIG. 3.

Preferably a radially outwardly magnetic ring conductor 32 is provided which radially outwardly defines the damping duct 11 or the damping ducts 11 and 12. The field generating units 33 and 34 etc. follow radially inwardly. The field generating units 33 and 34 are provided with a central, approximately sprocket-shaped or star-shaped body having radial projections, teeth, or cores 40, 41 around each of which a coil 38 or 39 is wound.

It is also possible for the field generating units 33 and 34 etc. to be provided radially outwardly while a magnetic ring conductor or multiple ring conductor segments are provided radially further inwardly.

Each one of the present total of eight different coils 38, 39 may be activated separately so as to apply different field strengths to respective damping ducts 11, 12 etc. or to portions of the entire damping duct.

In certain peripheral distances separators 62 are provided which act as magnetic isolators and which furthermore supply a defined, centered fastener of the field generating units 33, 34 in the ring conductor 32.

By way of the damping ducts 11, 12 extending ring-like around the piston rod 6 and by way of the radial distance of the damping ducts 11, 12 or the diameter 63 being larger than the inner diameter 28 of the second damping chamber the axial length 65 of the damping ducts can be considerably reduced. Presently the radial distance of the damping ducts 11, 12 or the diameter 63 is also larger than the diameter 20 of the spring device 21 (see FIG. 3). The maximum flow speeds occurring in the damping ducts 11, 12 are low due to the cross-sectional areas of the damping ducts 11, 12 being larger on the whole. If, however, the damping ducts were provided for example inside the damper piston 5 then, given the same height and length of the damping duct, the flow speeds in the damping ducts would be higher due to the considerably reduced diameter 28 of the damper piston. Then the damper piston 5 would have to have a correspondingly longer axial length which would result in a larger mounting space or would reduce the stroke length.

Intentional control of particular coils 38, 39 by means of the control device 46 allows to subject the damping ducts 11, 12 to fields of different strengths so as to generate different damping sections across the entire cross-sectional area. For example a bypass section 37 may be generated at a damping duct when the adjacent coils 39 are switched currentless such that no magnetic field or only a weak magnetic field acts. In this case the bypass section 37 acts as a bypass. When maximum electric current is applied to the coils 38 on both sides of the damping duct then a blocking section 36 will form which virtually prohibits any magneto-rheological fluid 9 from passing through.

In the illustrated example the entire damping duct 11, 12 can thus be subdivided into 8 sections having different characteristics corresponding to the current in the pertaining field generating units 33, 34. A transition section 35 may form when a magnetic field 10 is applied in one or multiple sections between blocking section 36 and bypass section 37 having a field strength between that in the blocking section 36 and the field of the bypass section 37.

Skillful arrangement and magnetization of the cores 40, 41 and magnetic stray fields also allow to achieve inhomogeneous areas within any one segment of the damping duct 11, 12.

Additionally to the throttle valve 45 further valves 66 and 67 may be provided for example in the damper piston 5 as illustrated in FIG. 3. These valves 66 and 67 are preferably configured as one-way valves and may be configured with a spring biased in its closed position. It is preferred to employ shims which allow passage in relation to forces. Valves configured as blow-off valves may e.g. offer overload protection.

Employing these valves 66, 67 or one of these two valves 66, 67 allows for example to have the electronic throttle valve 45 activated in the compression stage only while for example for the rebound stage the valve 66 is set fixed, allowing immediate transfer through the damper piston 5. Reversely it is also possible for the mechanical valve 67 to operate in the compression stage while flow in the rebound stage occurs by way of the throttling device 8.

The control device 46 is provided in the electronic unit 50c which is provided to be exchangeable. For beginners, an electronic unit 50a may be attached offering just a few adjusting options or even none at all to not overtax the user.

A user having gained sufficient experience may replace the electronic unit 50a by an electronic unit 50b or 50c or upgrade it so as to provide the user with more adjusting options and functions.

Thus for example a data store may be provided for capturing and storing tour data. Optionally any data previously stored in the control device or on a computer or in the internet may be downloaded to obtain optimal settings for an intended tour.

The shock absorber 100 may be provided with permanent magnets 43, 44 whose magnetic field strengths can be permanently changed in operation by appropriate magnetic pulses of the coils 38, 39.

Figure 5:
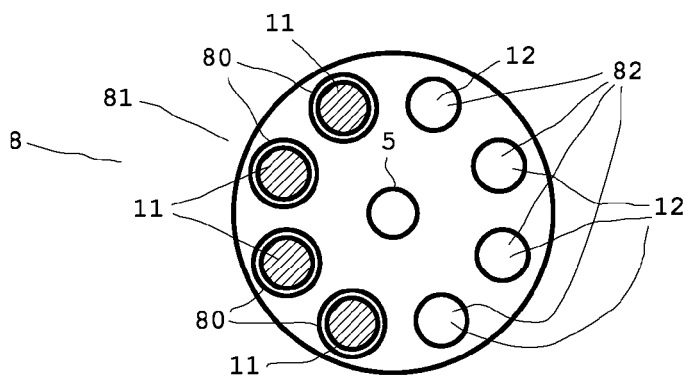
FIG. 5 another simplistic cross-sectional view of another throttling device.

FIG. 5 shows a simplistic cross-section of another throttling device 8 or a throttle valve 45 for a shock absorber according to FIG. 3 with a total of 8 damping ducts 11, 12 provided. Presently two groups or duct groups 81 and 82 are provided with four damping ducts 11 each, forming the duct group 81, and four damping ducts 12 each, forming the duct group 82. The duct group 81 is provided in one flow direction with one-way valves presently configured as shim valves 80 which allow passage of fluid e.g. in the compression stage only. This means that then all of the total of eight damping ducts 11 and 12 of the duct groups 81 and 82 are activated in the compression stage while in the rebound stage the four damping ducts of the duct group 81 are blocked by the respective shim valves 80. This already results in mechanically different characteristic damper curves for the compression stage and the rebound stage so as to require less electric energy for achieving the characteristic curve required. Reversed realization is also possible where in the compression stage the four damping ducts of the duct group 81 are blocked by the respective shim valves 80 while in the rebound stage all of the damping ducts are activated. These shim valves allow a simple mechanical definition of the maximum flow cross-section in one flow direction.

These additional valves may be located in the region of the damping duct or in another place of the damper such as the flow duct or the damping piston. Depending on the application a great variety of additional valves such as shim valves dependent on the flow direction and/or the pressure, valves dependent on the temperature or other parameters or else controllable electromechanical valves may be employed. These additional valves may block or enable flow through at least part of at least one damping duct, or increase flow resistance or form a bypass to the damping duct.

Furthermore at least one partition or partition wall 83 may be provided transverse to the magnetic field for segmenting into two sub-ducts 84, 85 at least one damping duct in the direction of the field lines. The partition wall 83 consists of a magnetic conductor. This allows to decrease the field strength required for a specific chain-formation of the magneto-rheological particles to thus allow very low energy requirement of the coil.

Figure 6:
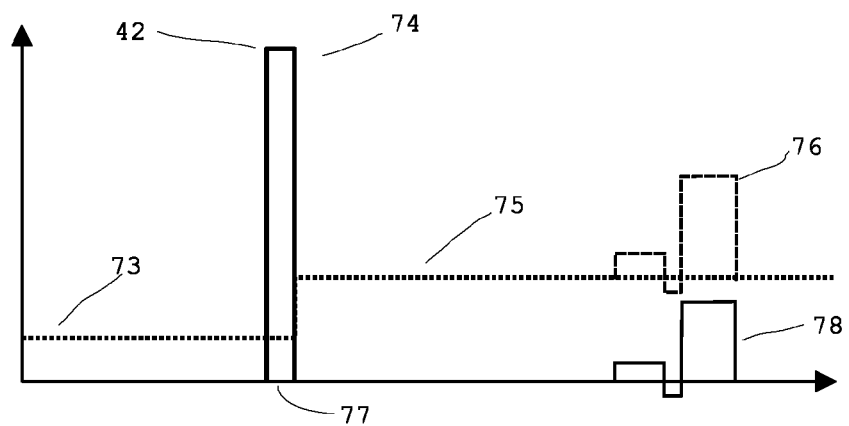
FIG. 6 a possible field strength curve over time.

FIG. 6 shows the function in changing or setting a desired magnetic field strength from a first magnetic field strength 73 to a second magnetic field strength 75. What is shown is the strength of the magnetic field over time. The field strength of the permanent magnet 43, 44 is shown in dotted lines while the magnetic field 74 generated by the electric coil 38 during the pulse 42 is inserted in a solid line.

It is clearly recognizable that the magnetic field strength 74 generated by the electric coil 38 is zero for most of the time since a magnetic field generated by the electric coil 38 is not required for normal operation and thus no electric energy is required.

A magnetic field 74 generated by the electric coil 38 is required only when changes to the magnetic field strength 73, 75 of the permanent magnet 43 are sought.

Thus the magnetic field strength 73 generated by the permanent magnet 43 firstly shows a lower value until the electric coil 38 triggers a magnetic pulse 42. The magnetic field strength 74 generated by the electric coil 38 shows a strength with which to permanently magnetize the permanent magnet 43, 44 at an appropriate strength.

For example the magnetic field strength of the permanent magnet 43, 44 may be increased from an initially lower field strength 73 to an increased field strength 75 to effect a higher damping strength or to close the damping valve 45.

While the pulse length 77 for the magnetic pulse 42 is very short and may be in the range of a few milliseconds, the permanent magnet 43, 44 subsequently permanently shows the high magnetic field strength 75 which, given a corresponding magnetic field strength 74 of the magnetic pulse 42, may attain saturation of the hard-magnetic material employed. The magnetic field strength 74 generated by the coil 38 during the magnetic pulse 42 causes a permanent change of the magnetic field strength of the magnet 43 from an initial magnetic field strength 73 to a magnetic field strength 75.

It is apparent in FIG. 6 that the energy savings compared to a conventional system continuously requiring current depends on the frequency of re-magnetizations. However, even in the case of frequent re-magnetizations for example once every second, the energy required may be less than in a similar system not involving remanence. When re-magnetization is activated only as needed, for example as road conditions change, the advantage over other systems becomes considerably clearer still.

Given an accordingly lower magnetization of the permanent magnet 43, 44, a correspondingly lower magnetic field is generated. A de-magnetization may be generated by an attenuating alternating magnetic field.

FIG. 6 furthermore schematically shows on the right in the diagram a situation in which the coil 38 is also used for time-based modification of the effective magnetic field. When the coil 38 is exposed only to a weak current 78 that is also e.g. variable over time, as is inserted on the right in FIG. 8 in a solid line, then the entirety of the effective magnetic field 76 is influenced accordingly and strengthened or attenuated in relation to its polarization. This also allows dynamically influencing the effective magnetic field 76 without changing the permanent magnetization of the permanent magnet 43 (field strength 75).

In analogy the other coils 38, 39 may be employed for influencing the other cores 40, 41. Influencing may occur synchronously. For generating different sections such as a transition or bypass section individual coils 38, 39 may be controlled differently.

FIG. 7 shows a characteristic damper curve 90 of the shock absorber 1 in a force-speed diagram of the damper piston. The low-speed range 91 and the high-speed range 92 are connected with a radius 93 by way of a gentle rounding. The characteristic curve is presently symmetrical in structure, showing the same curve for the rebound and the compression stages. Basically, however, different curves of the two stages are possible and desired.

In the shock absorber 100 the gradient 94 of the characteristic damper curve in the low-speed range 91 is substantially determined by the bypass section 37. In the high-speed range 92 the gradient 95 is substantially determined by the total cross-section of the damping ducts 11, 12 and by the strength of the field in the blocking section 36.

A transition section 35 with a magnetic field attenuating across its extension leads to an advantageous and non-linear contour and to the rounding which leads to a comfortable and safe operation.

Furthermore an arrow 97 is inserted indicating the effect of a magnetic field having different strengths. Given a higher magnetic field strength the characteristic curve shifts upwardly while with a weaker magnetic field it shifts downwardly.

Dotted lines show a characteristic damper curve 98 which results when a bypass section 37 is present but no transition section 35.

The gradient in the low-speed range 94 is adjustable by means of the portion of the bypass section 37. The larger the bypass section 37, the smaller the gradient. The zero passage is again generated by the bypass section 37 since damping fluid can at any time flow through the bypass section 37 without being influenced such that damper piston movement will already be triggered at weak forces.

The gradient in the high-speed range 95 is influenced by the shape of the entire flow duct and the damping ducts 11 and 12 and the set strength of the magnetic field 75 in the effective section or blocking section 36.

The range with the rounding which is significant for comfort and safety is rounded by way of the transition section 35 of the damping duct 11 or 12 so as to enable an ergonomic and safe operation. The size of the rounded range ensues from the size and shape of the transition section 35 which can be flexibly adjusted by corresponding adjustment of the strength of the magnetic fields of the field generating devices 13, 14.

Power supply may likewise be supported by means of a generator, dynamo generator or in particular a hub dynamo.

FIGS. 8 and 9 schematically illustrate two further electronic units 50a and 50b. The simple structure of the electronic unit 50a in FIG. 8 is provided for beginners having elementary knowledge and comprises 2 operating knobs 51 and 52 and a display 49 in the shape of a light-emitting diode. One of the operating knobs 51, 52 may be provided for increasing damping and the other, for decreasing damping.

In FIG. 8 three different battery units 61a, 61b and 61c are exemplarily inserted which can be alternatively attached to the electronic units 50a to 50c. A smaller and lighter variant 61a is suitable for races or short tours while for longer tours the larger and heavier battery units 61b and 61c having larger capacity are better suitable.

The electronic unit 50b in FIG. 9 may be largely identical with the electronic unit 50c in FIG. 3, offering a plurality of adjustment options. In this variant, autonomous control is provided by means of the incorporated control device 46. Data connections with a central control device cannot be established during rides.

Each of the variants of the electronic units 50a, 50b or 50c allows fully automatic operation. The categories and scope of the adjustment options may differ largely though. A plausibility check is preferably provided for all the operating options so as to prevent disadvantageous, damaging, or dangerous settings.

In another variant the shock absorbers are controlled via a central control device. For example with groups of cyclists traveling in a guided tour or in training, the guide or trainer can centrally operate controls for all of the riders. Controlling by way of previously stored data is likewise possible. In these cases every rider gets optimal settings even on unknown routes. In this operating mode, operator input may be ignored to thus provide a pure, fully automatic operation.

In all of the cases it is preferred that a third spring chamber is provided to be activated additionally for varying the suspension hardness.

The following is a list of reference numerals used in the above description. The list may aid the reader in the perusal of the specification:

1 damper device
2 damper housing
3 first damper chamber
4 second damper chamber
5 damper piston
6 piston rod
7 flow duct
8 throttling device
9 fluid
10 field
11, 12 damping duct
13, 14 field generating device
15 first end
16 second end
17 first connection
18 second connection
19 outside
20 diameter
21 spring device
22 spring housing
23 first spring chamber
24 second spring chamber
25 spring piston
26 seal
27 inside
28 diameter
29, 30 flow duct
31 magnetic device
32 ring conductor
33, 34 field generating unit
35 transition section
36 blocking section
37 bypass section
38, 39 coil
40, 41 core
42 pulse
43, 44 permanent magnet
45 throttle valve
46 control device
47 sensor
48 operating device
49 display
50a-c electronic unit
51, 52 operating knob
54 network interface
55 radio network interface
56 cable connection
57 graphical operating unit
60 control device
61a-c battery unit
62 separator
63 diameter
65 axial length
66, 67 valve
68, 69 arrow
70 internet
71 equalizing space
72 equalizing piston
73-76 field strength
77 duration
78 electric current
80 shim valve
81, 82 duct group
82 partition wall
84, 85 sub-duct
90 characteristic damper curve
91 low-speed range
92 high-speed range
93 radius
94, 95 gradient
96 break point
97 arrow
98 characteristic damper curve
100 shock absorber
111 front wheel
112 rear wheel
113 frame
114 suspension fork
115 rear wheel damper
116 handlebar
117 saddle
200 bicycle

The invention claimed is:

1. A shock absorber for a muscle-powered or partially muscle-powered vehicle, the shock absorber comprising:
a damper device having a damper housing with a first damper chamber and a second damper chamber formed therein;
at least one damper piston separating said first and second damper chamber from one another, and a piston rod connected to said damper piston and extending from said damper piston and through said second damper chamber out of said damper housing;
at least one throttling device;
said piston rod having a flow duct formed therein and fluidically connecting said first and second damper chambers to one another, extending through said piston rod and to said at least one throttling device;
said flow duct including at least one damping duct at said throttling device provided, said flow duct containing a field-sensitive rheological fluid; and
a field generating device disposed at said throttling device for subjecting said field-sensitive rheological fluid to a field of a predetermined strength for influencing a flow of said field-sensitive rheological fluid through said throttling device; and
at least one spring device including a first and at least one second spring chamber provided with a compressible medium.

2. The shock absorber according to claim 1, wherein the vehicle is a bicycle and said damper device is configured for the bicycle.

3. The shock absorber according to claim 1, wherein, upon being subject to compression, said damper housing dips into said spring device whereupon said first spring chamber radially surrounds at least in part said second damper chamber at least in a rebound state.

4. The shock absorber according to claim 1, wherein said throttling device comprises multiple damping ducts distributed about a periphery thereof.

5. A shock absorber for a muscle-powered or partially muscle-powered vehicle, the shock absorber comprising:
a damper device having a damper housing with a first damper chamber and a second damper chamber formed therein;
at least one damper piston separating said first and second damper chamber from one another, and a piston rod connected to said damper piston and extending from said damper piston and through said second damper chamber out of said damper housing;
at least one throttling device;
said piston rod having a flow duct formed therein and fluidically connecting said first and second damper chambers to one another, extending through said piston rod and to said at least one throttling device;
said flow duct including at least one damping duct at said throttling device provided, said flow duct containing a field-sensitive rheoloqical fluid; and
a field generating device disposed at said throttling device for subjecting said field-sensitive rheoloqical fluid to a field of a predetermined strength for influencing a flow of said field-sensitive rheoloqical fluid through said throttling device;
said throttling device having multiple damping ducts distributed about a periphery thereof, wherein a length of said damping ducts transverse to a flow direction is greater than a periphery of said damper piston.

6. The shock absorber according to claim 1, wherein, at said throttling device, at least one said flow duct is subdivided into at least two damping ducts by way of a separator.

7. The shock absorber according to claim 1, wherein at least one damping duct can be exposed to a field of the field generating device extending in the radial direction.

8. The shock absorber according to claim 1, wherein at least one damping duct can be exposed to a field of the field generating device extending in the axial direction.

9. The shock absorber according to claim 1, wherein said piston rod is formed with at least two said flow ducts.

10. The shock absorber according to claim 9, wherein said piston rod is a double-walled rod.

11. The shock absorber according to claim 1, wherein a maximum flow cross-section in the compression stage and a maximum flow cross-section in rebound stage are different.

12. The shock absorber according to claim 11, which comprises at least one mechanical one-way valve defining the maximum flow cross-section in the compression stage and/or in the rebound stage.

13. A shock absorber for a muscle-powered or partially muscle-powered vehicle, the shock absorber comprising:
a damper device having a damper housing with a first damper chamber and a second damper chamber formed therein;
at least one damper piston separating said first and second damper chamber from one another, and a piston rod connected to said damper piston and extending from said damper piston and through said second damper chamber out of said damper housing;
at least one throttling device;
said piston rod having a flow duct formed therein and fluidically connecting said first and second damper chambers to one another, extending through said piston rod and to said at least one throttling device;
said flow duct including at least one damping duct at said throttling device provided, said flow duct containing a field-sensitive rheoloqical fluid; and
a field generating device disposed at said throttling device for subjecting said field-sensitive rheoloqical fluid to a field of a predetermined strength for influencing a flow of said field-sensitive rheoloqical fluid through said throttling device;
wherein a maximum flow cross-section in the compression stage and a maximum flow cross-section in rebound stage are different; and
further comprising a shim valve in said at least one damping duct.

14. The shock absorber according to claim 1, which comprises at least one flow valve disposed in said damper piston.

15. The shock absorber according to claim 1, wherein said at least one flow valve in said damper piston is a one-way valve.

16. The shock absorber according to claim 1, wherein said field generating device comprises at least one field generating unit.

17. The shock absorber according to claim 1, wherein at least one damping duct is subject to exposure to an inhomogeneous field.

18. The shock absorber according to claim 1, wherein a flow cross-section of said at least one damping duct is defined by at least one transition section and at least one blocking section and/or at least one bypass section.

19. A shock absorber for a muscle-powered or partially muscle-powered vehicle, the shock absorber comprising:
a damper device having a damper housing with a first damper chamber and a second damper chamber formed therein;
at least one damper piston separating said first and second damper chamber from one another, and a piston rod connected to said damper piston and extending from said damper piston and through said second damper chamber out of said damper housing;
at least one throttling device;
said piston rod having a flow duct formed therein and fluidically connecting said first and second damper chambers to one another, extending through said piston rod and to said at least one throttling device;
said flow duct including at least one damping duct at said throttling device provided, said flow duct containing a field-sensitive rheoloqical fluid; and
a field generating device disposed at said throttling device for subjecting said field-sensitive rheoloqical fluid to a field of a predetermined strength for influencing a flow of said field-sensitive rheoloqical fluid through said throttling device;
wherein a flow cross-section of said at least one damping duct is defined by at least one transition section and at least one blocking section and/or at least one bypass section, and
wherein at least a portion of the transition section and/or of the bypass section is adjustable at the cross-sectional area of the flow duct.

20. The shock absorber according to claim 1, wherein said field generating device includes at least two field generating units and at least two said damping ducts can be exposed to fields of different strengths of different field generating units.

21. The shock absorber according to claim 1, wherein at least one field generating device is configured as a magnetic device.

22. The shock absorber according to claim 21, wherein said field generating device comprises at least one magnetically conductive ring conductor.

23. The shock absorber according to claim 22, wherein said magnetically conductive ring conductor is formed to surround said at least one damping duct in a radial direction.

24. The shock absorber according to claim 21, wherein said magnetic device comprises at least one permanent magnet for generating a static magnetic field.

25. The shock absorber according to claim 21, wherein said field generating unit comprises at least one coil.

26. The shock absorber according to claim 25, wherein at least one said field generating unit comprises a permanent magnet having a magnetization to be set permanently by way of at least one magnetic pulse of said coil.

27. The shock absorber according to claim 1, wherein said damper housing and an optional spring housing are formed of a non-magnetic material.

28. The shock absorber according to claim 27, wherein said non-magnetic material is a light metal alloy or a fibrous composite material.

29. The shock absorber according to claim 1, which comprises a control device and/or at least one sensor for controlling said field generating device.

30. A shock absorber for a muscle-powered or partially muscle-powered vehicle, the shock absorber comprising:
- a damper device having a damper housing with a first damper chamber and a second damper chamber formed therein;
- at least one damper piston separating said first and second damper chamber from one another, and a piston rod connected to said damper piston and extending from said damper piston and through said second damper chamber out of said damper housing;
- at least one throttling device;
- said piston rod having a flow duct formed therein and fluidically connecting said first and second damper chambers to one another, extending through said piston rod and to said at least one throttling device;
- said flow duct including at least one damping duct at said throttling device provided, said flow duct containing a field-sensitive rheoloqical fluid; and
- a field generating device disposed at said throttling device for subjecting said field-sensitive rheoloqical fluid to a field of a predetermined strength for influencing a flow of said field-sensitive rheoloqical fluid through said throttling device,
- wherein said throttling device is disposed external of said damper housing in at least one relative position of said damper piston relative to said damper chambers.

* * * * *